United States Patent [19]
Etter

[11] 3,879,651
[45] Apr. 22, 1975

[54] UNDULATOR

[76] Inventor: Marcel Etter, 3 bis, chemin des Pontets, Grand-Lancy, Switzerland

[22] Filed: July 6, 1973

[21] Appl. No.: 377,099

[30] Foreign Application Priority Data
July 14, 1972 Switzerland.................. 10632/72

[52] U.S. Cl............................................. 321/45 C
[51] Int. Cl. ........................................... H02m 7/52
[58] Field of Search .............................. 321/5, 45 C

[56] References Cited
UNITED STATES PATENTS

| | | | |
|---|---|---|---|
| 3,315,145 | 4/1967 | Menard............................ | 321/45 C |
| 3,388,310 | 6/1968 | Etter................................ | 321/5 |
| 3,399,336 | 8/1968 | Koppelmann..................... | 321/5 |
| 3,469,169 | 9/1969 | Schlabach et al................. | 321/5 |
| 3,559,034 | 1/1971 | Jensen et al. .................... | 321/45 X |

FOREIGN PATENTS OR APPLICATIONS
1,563,262  3/1970  Germany............................ 321/45 C

*Primary Examiner*—R. N. Envall, Jr.
*Attorney, Agent, or Firm*—Emory L. Groff, Jr.

[57] ABSTRACT

An undulator or inverter of the type including units constituted by thyristors and diodes inserted in series between the positive and negative leads of a D.C. supply and adapted to feed corresponding phase outputs, wherein the supply is provided with at least one tapping feeding an intermediate voltage and the thyristor-extinguishing means common to all the units are inserted between the intermediate voltage lead and each of the positive and negative leads in succession, while the stepped modification in the phase outputs is obtained through further thyristors inserted between the intermediate voltage lead and the different phase outputs.

2 Claims, 1 Drawing Figure

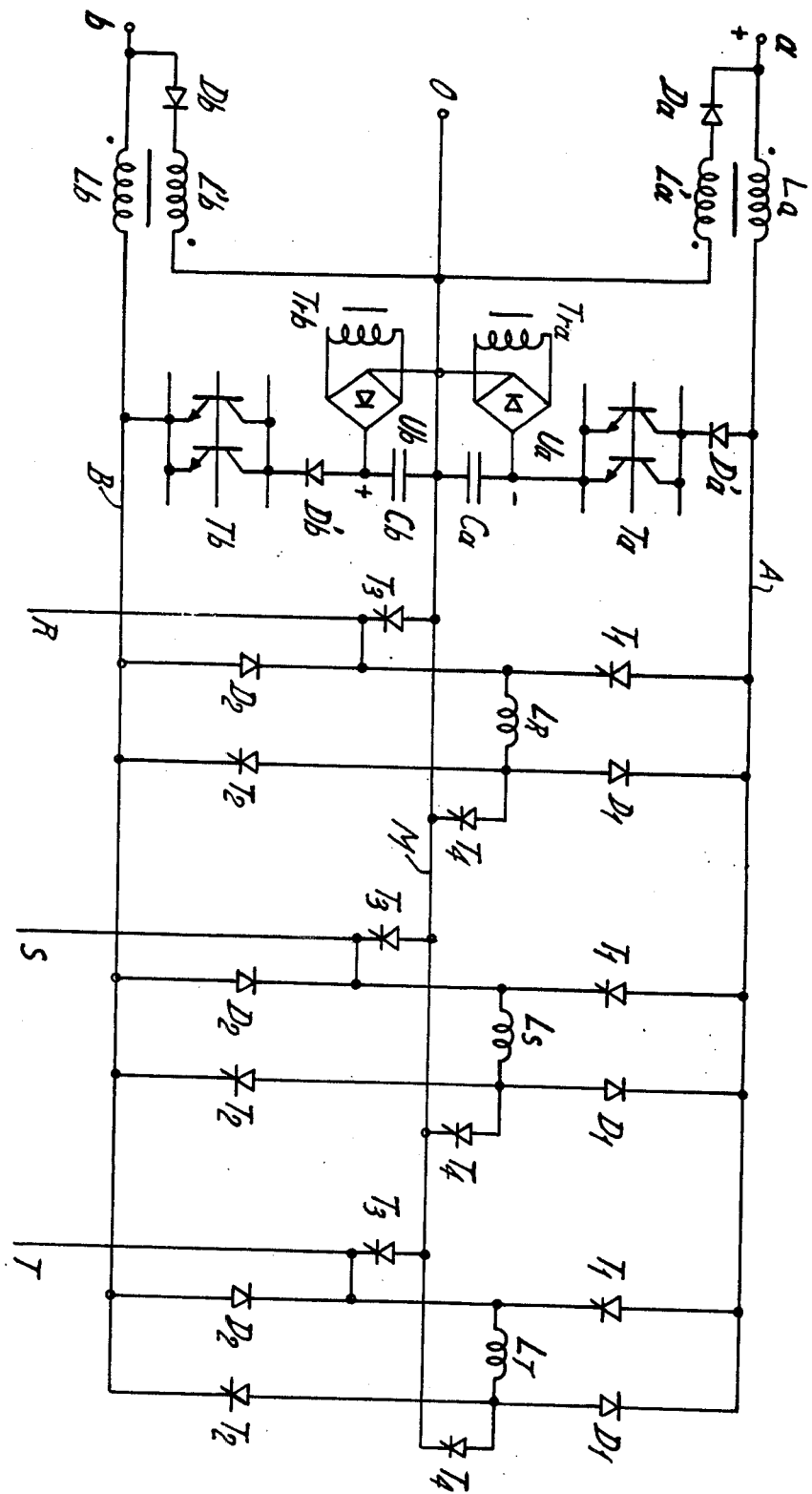

UNDULATOR

Undulators also known as inverters, are already known which are fed through a supply of D.C. and include at least one phase unit constituted by at least two thyristors and two diodes forming two arms, said unit being adapted to connect selectively the phase output with either of the terminals of the D.C. supply while means are provided for ensuring as desired the conductivity of each of the thyristors and extinguishing means are furthermore provided for returning into their non-conductive condition, the thyristors which are in a conductive condition, each thyristor being connected in series with a diode of an opposite polarity, so as to form one of the arms of the unit to be considered and the thyristors in the cooperating arms of the unit being connected each, on the one hand, with the corresponding terminal of the D.C. supply and, on the other hand, with the phase output.

It is also a known fact that it is possible to generate a voltage, the curve defining which progresses stepwise, by means of two undulators the phases of which are shifted by 30°, so as to approximate a sinusoidal behaviour. In such a case, the current is transmitted through transformers the secondaries of which are connected in series in order to ease the steps of the curve and to obtain a favorable shape factor. However, the presence of the transformers cuts out the production of currents of a very low intensity.

The present invention has for its object to improve the shape of the signal supplied by an undulator adapted to feed an electric motor, for instance, without resorting to any transformers, so that it becomes thus possible to produce signals of a very low frequency, say under 5 cycles.

According to the invention, the supply for the improved undulator includes at least one further lead at a voltage the value of which lies between the voltages of its positive and negative terminals, the phase output being connected with said lead through two further thyristors of which one is connected with said lead through its cathode and the other through its anode.

The single FIGURE of the accompanying drawing illustrates diagrammatically and by way of example one embodiment of said improved undulator.

The undulator of said embodiment is fed by a supply of D.C., not illustrated, the positive pole of which is connected with the terminal $a$ and the negative pole with the terminal $b$. Said supply is furthermore provided with an intermediate tapping of voltage which is connected with the O terminal of the undulator corresponding to the further lead M.

The undulator illustrated is a three-phase undulator the outputs of which are shown at R, S and T. Each output is fed by a unit constituted by two thyristors $T_1$ and $T_2$ and by two diodes $D_1$ and $D_2$ forming together two arms $T_1 — D_2$ and $T_2 — D_1$. The points interconnecting the transistor and diode in each arm are connected with each other by an induction coil of a comparatively low value as shown at $L_R$, $L_S$ and $L_T$. The phase outputs R, S, T are connected each with one of the terminals of the corresponding induction coil.

In each unit $T_1$, $T_2$, $D_1$, $D_2$, the opposite terminals of the induction coil are connected respectively with the cathode of a further thyristor $T_3$ and with the anode of another further thyristor $T_4$. The main electrode of each further thyristor $T_3$ or $T_4$ which is not connected with the induction coil is connected with the lead M fed with the intermediate voltage from the terminal O.

The undulator illustrated includes furthermore two extinguishing circuits common to the different phase units, each of which, described hereinafter, is inserted between the lead M for the intermediate voltage and the corresponding feed lead A or B fed respectively by the terminal $a$ or the terminal $b$. Between each of said terminals $a$ or $b$ and the corresponding extinguishing circuit, there is inserted an auxiliary induction coil $L_a$ or $L_b$. Each of said auxiliary induction coils is coupled with a primary $L_a'$ or $L_b'$ inserted in series with a corresponding diode $D_a$ or $D_b$ between the intermediate voltage lead M and the corresponding terminal $a$ or $b$.

Each extinguishing circuit includes a supply constituted by the secondary $Tr_a$ or $Tr_b$ of a transformer fed by the mains and feeding a corresponding rectifier $U_a$ or $U_b$ adapted to load a condenser $C_a$ or $C_b$. The voltage of said condensers may be discharged by a battery of transistors $T_a$ or $T_b$ in series with a diode $D_a'$ or $D_b'$ adapted to protect said transistors against fortuitous reversed voltages, between the lead A connected with the terminal $a$ or the lead B connected with the terminal $b$ on the one hand and the intermediate voltage lead M on the other hand.

The operation of said undulator is as follows:

A control system, not illustrated, is adapted to ignite, in a predetermined sequence, the different thyristors in each unit and to simultaneously control the state of conductivity or non-conductivity of the transistor batteries $T_a$ and $T_b$ which ensure the extinction of those thyristors the operation of which is no longer desired.

Turning now to the unit connected with the phase output R, it will be assumed that the thyristor $T_1$ is at first conductive, so that the voltage applied onto the phase output R is substantially equal to the positive voltage of the terminal $a$. The positive current passing out of said terminal $a$ flows in fact through the induction coil $L_a$ and the thyristor $T_1$ into the phase output R. After a predetermined duration, the further thyristor $T_3$ is ready to be brought into its conductive condition upon application of a signal onto its control electrode, as provided by means well-known per se, which are not illustrated. At the same time, the battery of transistors $T_a$ becomes transiently conductive and the condenser $C_a$ is discharged through the further thyristor $T_3$, thus rendered conductive, so as to feed the thyristor $T_1$ in a reversed sense, whereby the latter is extinguished; the phase output R is connected now through the further thyristor $T_3$ with the intermediate voltage lead M.

This being done, the control circuit, which is not illustrated, applies a suitable voltage onto the control electrode of the other thyristor $T_2$ and renders transiently conductive the transistors of the transistor battery $T_b$. The condenser $C_b$ is then discharged through said battery and the diode $D_2$ into the ignited thyristor $T_3$ which the reversed current thus provided extinguishes. The phase output R is now connected with the negative lead B through the diode $D_2$ as long as the current remains positive after which, the connection is obtained, as soon as the phase current is reversed, through the induction coil $L_R$ and the thyristor $T_2$. In order to return in two stages the phase output R to a feed through the positive voltage of the supply, the further thyristor $T_4$ is first rendered conductive at the same time as the transistors of the transistor battery $T_b$, so that consequently the condenser $C_b$ is discharged into said battery through the ignited thyristor $T_2$ which is extinguished by such a reversed current and through the further thyristor $T_4$ into the intermediate voltage lead. The next stage consists in a control of the thyristor $T_1$ which is returned to a conductive condition together with the transistors of the battery $T_a$. The current discharged by the condenser $C_a$ passes then in a reversed direction through the ignited thyristor $T_4$ in order to extinguish same and through the diodes $D_1$ and $D_a'$.

Obviously, the operation of the two other units feeding the corresponding phase outputs S and T is quite similar. Since the further thyristors $T_3$ and $T_4$ remain each ignited over 30° of the period of the phase output current, there is obtained for each phase a stepped voltage, the voltage steps of which are shifted in time with reference to the voltage steps in the other phase outputs. Thus the difference in voltage between two phases includes a number of steps which is twice greater, so that the shape factor obtained is considerably improved.

Each time one of the transistor batteries $T_a$ or $T_b$ is rendered conductive, a sudden modification of the current in the lead A or the lead B is obtained, which modification is attenuated or damped by the corresponding induction coil $L_a$ or $L_b$. The overvoltages appearing in the induction coils at the end of the conductivity-controlling pulse in the transistors $T_a$ or $T_b$ are limited in their value by the cooperating secondaries $L_a'$ or $L_b'$ inserted in series with the corresponding diodes $D_a$ or $D_b$.

One of the advantages of the above-described undulator consists in that only two extinguishing circuits are required for extinguishing all the thyristors, whatever may be the number of phases to be fed.

Obviously, many modifications may be brought to the embodiment disclosed and, in the case where it is desired to still further improve the shape factor, it is of course possible to provide the D.C. supply with a plurality of tappings feeding intermediate voltage leads. In this latter case, each intermediate voltage lead is connected through two further thyristors with each phase output; this is ensured in a manner such that each of the further thyristors is connected with the thyristor in one arm of the corresponding unit, through a direct cathode-cathode connection for one of them and through a direct anode-anode connection for the other further thyristor. It is then necessary to insert an extinguishing circuit between each intermediate voltage lead and the adjacent lead.

Obviously, the principle of the undulator refered to is applicable as well for one-phase undulator and for undulators with more than three output phases.

If it is desired to adjust the amplitude of the output voltage when the input D.C. supply operates under constant voltage conditions or if it is desired to still further improve the shape factor, it is possible to resort to positive or negative pulses of a variable breadth, the frequency of which is much higher than that which is expected for the output signal. It may then be of interest to substitute thyristors for the diodes $D_1$ and $D_2$ in order to prevent any transient undiscriminating extinction of several thyristors during the extinguishing pulses. This may happen, for instance, whenever two thyristors such as $T_4$ or $T_3$ are simultaneously conductive before the arrival of an extinguishing pulse through the corresponding lead A or B.

Obviously also, it is possible to resort to various types of extinguishing circuits and, in particular, it is possible to make use of any of the different circuits described in the U.S. Pat. No. 3,388,310.

What is claimed is:

1. In an inverter fed by a supply of D.C. including a positive and a negative terminal connected to a D.C. supply and feeding at least one phase output, the combination of at least one phase unit adapted to connect the corresponding phase output selectively with either of the supply terminals and including at least two arms inserted between the corresponding supply terminal and the corresponding phase output and each arm constituted by a main thyristor and a diode connected in series through their cathodes in one arm and their anodes in the other arm, said main thyristors adapted to be ignited at predetermined moments, at least one intermediate voltage lead connected to a terminal fed by the D.C. supply at a voltage intermediate between the voltages of its terminals, two further thyristors connected in parallel and of opposite polarities between each phase output and said intermediate voltage lead and a first extinguishing circuit connected between a supply terminal and the intermediate voltage lead, and a second extinguishing circuit connected between the other terminal and the intermediate voltage lead, and controlling the extinction of the corresponding main and further thyristors.

2. An inverter as claimed in claim 1, wherein the two further thyristors in each unit are connected with the corresponding main thyristor respectively through the cathodes and through the anodes of such interconnected thyristors.

* * * * *